Feb. 13, 1940.  A. PAGLIUCO  2,190,522
COFFEEPOT
Filed Jan. 27, 1939  4 Sheets-Sheet 1
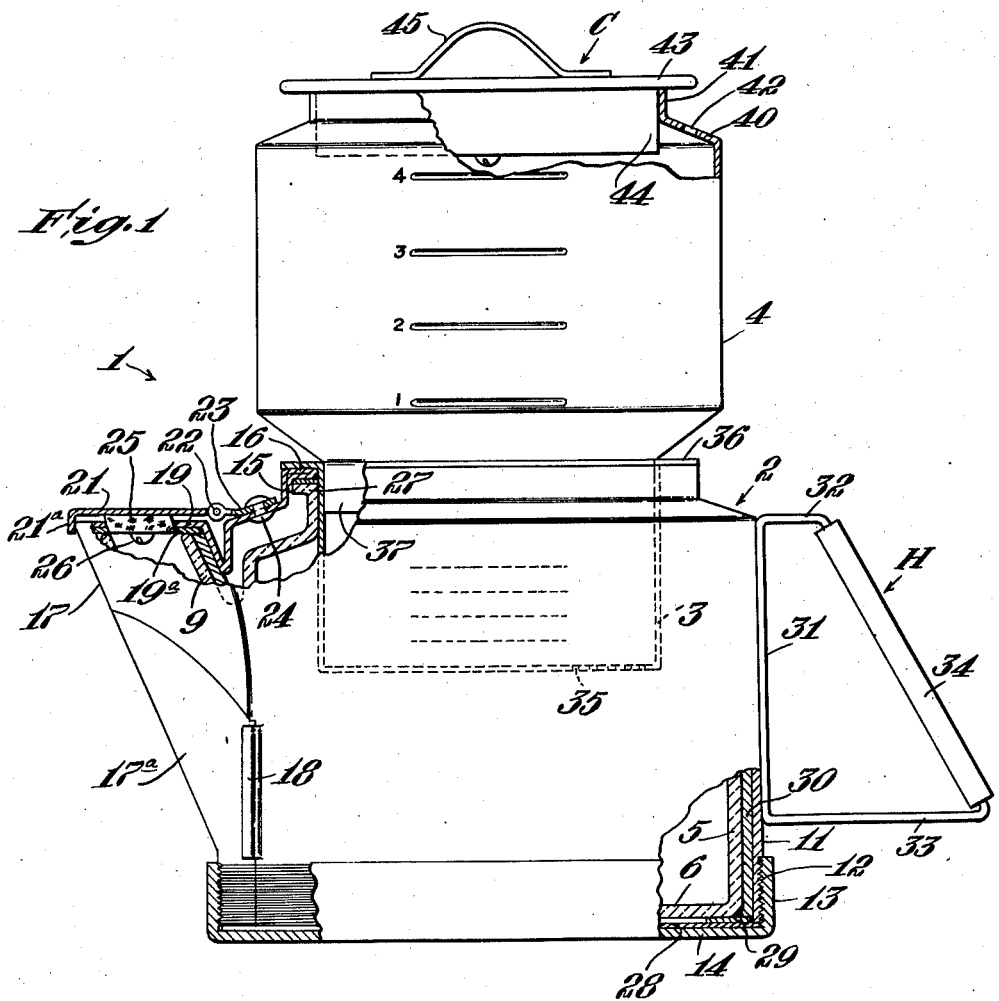
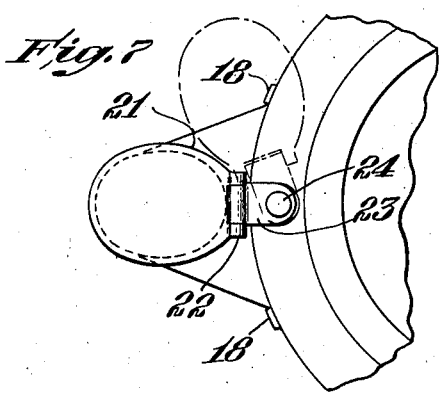
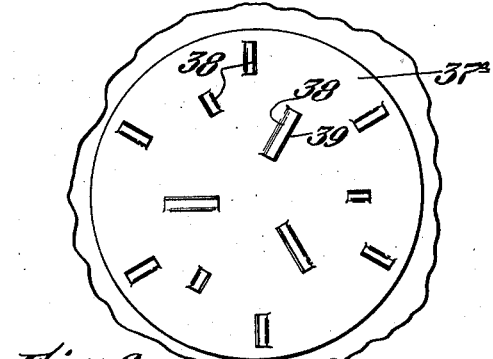

Feb. 13, 1940. A. PAGLIUCO 2,190,522
COFFEEPOT
Filed Jan. 27, 1939 4 Sheets-Sheet 2

Inventor
Antonio Pagliuco
by Roberts Cushman Woodberry
Att'ys.

Feb. 13, 1940.   A. PAGLIUCO   2,190,522
COFFEEPOT
Filed Jan. 27, 1939   4 Sheets-Sheet 3

Inventor
Antonio Pagliuco
by Roberts Cushman Woodbury
att'ys.

Feb. 13, 1940.  A. PAGLIUCO  2,190,522
COFFEEPOT
Filed Jan. 27, 1939   4 Sheets-Sheet 4

Inventor
Antonio Pagliuco
by Roberts Cushman & Woodberry
att'ys.

Patented Feb. 13, 1940

2,190,522

UNITED STATES PATENT OFFICE 2,190,522

COFFEEPOT

Antonio Pagliuco, Natick, Mass.

Application January 27, 1939, Serial No. 253,048

7 Claims. (Cl. 53—3)

This invention pertains to coffeepots, and while in its more specific aspects it relates especially to drip coffeepots, certain features are equally applicable to coffeepots of other types.

One of the objects of the present invention is to provide a coffeepot in which the beverage may be kept hot for a long period after infusion, but so designed that the hot liquid is held in a glass or other non-metal container until used.

A further object of the invention is to provide a heat-insulated cover for the pot proper, which may also be used as a cover for the hot water reservoir while infusion is taking place. Incidental to this double use of the heat-insulated cover, the upper part of the water reservoir itself is provided with a small inlet or air opening such as is usually provided in the cover itself of the coffeepot. In order to retain the heat in the liquid as long as possible, the spout of the coffeepot is furnished with a lid, preferably arranged to be moved completely out of the way while the coffee is being poured.

A further object is to provide a coffeepot in which the container for the hot liquid may be of simple form so as readily to be moulded from glass or the like—the handle, cover, etc., forming parts of the outer casing or shell, and with provision for ready removal of the glass container from the outer casing or shell, so that, for example, in the event that the glass container is broken, it may readily be replaced by a new one.

A further object of the invention is to provide a coffeepot having a glass or similar container for the hot coffee housed within an outer casing or shell of protective character, for example metal, and with interposed cushioning and insulating material between the container and the shell. Thus the container is insulated to prevent the rapid loss of heat and is also protected to prevent breakage by ordinary shocks or blows to the outer container or shell.

Another object is to provide a coffeepot having a hot water reservoir so designed as to ensure substantially uniform distribution of the water over a wide area of the ground coffee in the coffee container.

Further objects and advantages of the invention will be pointed out in the further more detailed description and by reference to the accompanying drawings, wherein Fig. 1 is a side elevation, partly in vertical section, showing the complete coffeepot with parts arranged in readiness for infusion of the coffee;

Fig. 7 is a fragmentary plan view showing the spout portion of the coffeepot with the lid closed;

Fig. 8 is a fragmentary bottom plan view of the hot water reservoir; and

Figure 2:
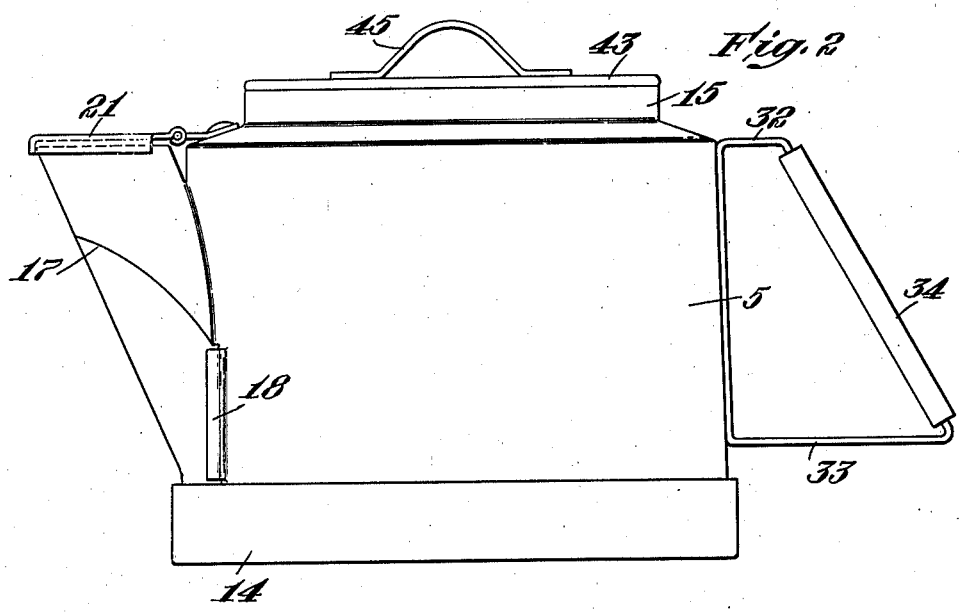
Fig. 2 is a similar view showing the coffeepot as it appears after infusion is completed and after removal of the water reservoir and coffee receptacle.

Referring to the drawings, the numeral 1 designates the pot as a whole comprising the pot proper, indicated by the numeral 2, the coffee receptacle or basket 3, and the hot water reservoir 4. The pot proper comprises the inner container 5, preferably of glass or other vitreous non-metallic material capable of storing the hot beverage for a long period without imparting any undesirable flavor thereto. This container 5 comprises a substantially cylindrical body portion having the bottom 6, and the neck portion 7, the latter having an outwardly projecting lip 7ª providing a thick upper edge 8 which is preferably flat. The container also includes the spout member 9 having the passage 10 through with the coffee is poured. Preferably this container is of unitary construction and, being of simple form, is readily made from glass or other mouldable material.

The pot proper also comprises an outer casing or shell, preferably of metal, for example, stainless steel, or ordinary steel enameled, nickel-plated or the like. This shell comprises the substantially cylindrical side wall portion 11 open at the bottom, and externally screw threaded at 12 near its lower edge for engagement with the internally screwthreaded flange 13 of the removable bottom cap 14. The upper part of the shell or casing is shaped to provide the neck portion 15 provided with an inwardly directed annular flange 16 which is bent back on itself to form the downturned annulus 16ª. The inner edge of the flange 16 defines the top opening of the shell, such opening being of substantially the same diameter as the internal diameter of the neck 7 of the container 5.

The outer casing or shell is furnished with a spout member 17 within which the spout member 9 of the container 5 is normally nested. In order to permit the container 5 to be introduced into the outer casing or shell, the lower portion 17ª of the spout 17 of the casing is movable relatively to the fixed upper portion. As shown, this portion 17ª has parallel vertical margins designed to be slid upwardly between two flange members 18 on the outer casing or shell 11. The lower end of the member 17ª preferably is screw threaded at 17ᵇ corresponding to the threading of the outer casing at 12, and is designed to be held within the flange 13 of the bottom cap 14 so that when the part 17ª has been slid upwardly to its normal position and the cap has been assembled with the casing, the part 17 of the spout is securely held in place. However, upon removal of the cap 14, the part 17ª may be slid downwardly so as to release the spout portion 9 of the container from the spout member of the casing.

The spout of the casing is furnished with an inwardly directed annular flange 19 at its upper end which defines an opening 20 (Fig. 3) which registers with the opening at the upper end of the spout member 9. A washer 19ª is interposed between the upper edge of the spout member 9 and the flange 19, this washer preferably being of resilient material.

The improved pot preferably is furnished with a lid member 21 which normally covers the open end of the composite spout comprising the parts 9 and 17. This lid 21 is hinged at 22 to turn upwardly about a horizontal axis, the hinge at 22 connecting the lid 21 with a movable flap 23 which, in turn, is secured to the outer casing or shell by means of a rivet or bolt at 24 defining an axis substantially at right angles to the axis of the hinge 22 about which the flap 23, together with the lid, may be swung horizontally so as to carry the lid laterally away from the upper end of the spout.

Preferably the lid has a downturned flange 24 which overhangs the upper end of the spout 17 and is also furnished with a plug 25 of resilient material, for example, cork or rubber, which may be secured to the lid proper by means of a screw 26 or other suitable device. When the lid is closed, this plug 25 extends downwardly into the passage 10, thus forming a tight seal to prevent the liquid from slopping out and to prevent the escape of steam and heat from the interior of the pot.

Figure 9:
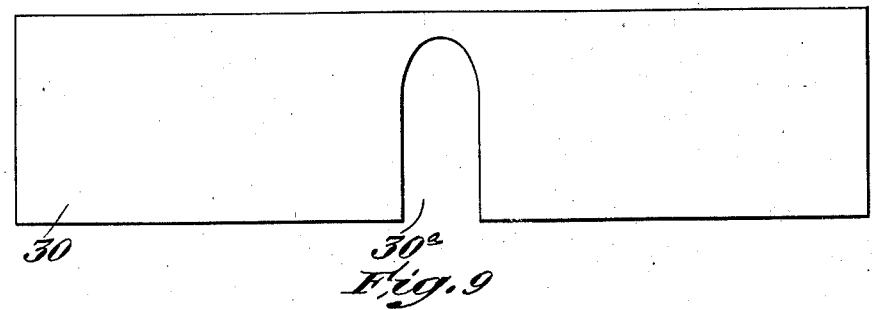
Figs. 9 and 10 are developed views of cushioning and insulating linings.
Figure 10:
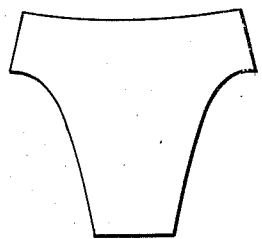

A washer 27 of resilient material is interposed between the upper edge 8 of the container 5 and the flange 16. A disk 28 of cushioning and insulating material is arranged within the bottom of the cap 14 and a suitable annular washer 29, preferably of a material, for instance copper, which is quite smooth so as not to exercise undue frictional restraint, is interposed between the liner disk 28 and the bottom 6. When the cap 14 is screwed into place, the washers 19ª and 27 and the lining member 28 are compressed, thus not only providing a cushion and insulation for the container 5, but also furnishing a close, leak-tight joint between the upper edge 8 of the container and the flange 16, and likewise between the upper edge of the spout 9 and the flange 19. The outer edge of the lip 7ª of the container fits snugly within the annulus 16ª at the top of the casing, thus helping to prevent breakage of the container by carelessness in putting the cover in place. A liner 30 (Fig. 9) of cushioning and insulating material, for example corrugated paper, sheet asbestos or the like, is interposed between the container 5 and the cylindrical wall 11 of the outer shell or casing. This liner 30, as shown in Fig. 9, may be a piece of the selected material of a length proper to encircle the container and having a recess 30ª for the spout of the container. A second lining member 30ᵇ of similar material is interposed between the spout members 9 and 17.

The outer shell or casing is furnished with a handle H, preferably comprising a frame having the part 31 which is secured to the shell, for example by spot-welding or rivets, and which includes the substantially horizontal upper member 32 and the longer lower member 33, the members 32 and 33 being united by a downwardly sloping part provided with a grip 34 which may be of a suitable insulating and preferably ornamental material.

Figure 3:
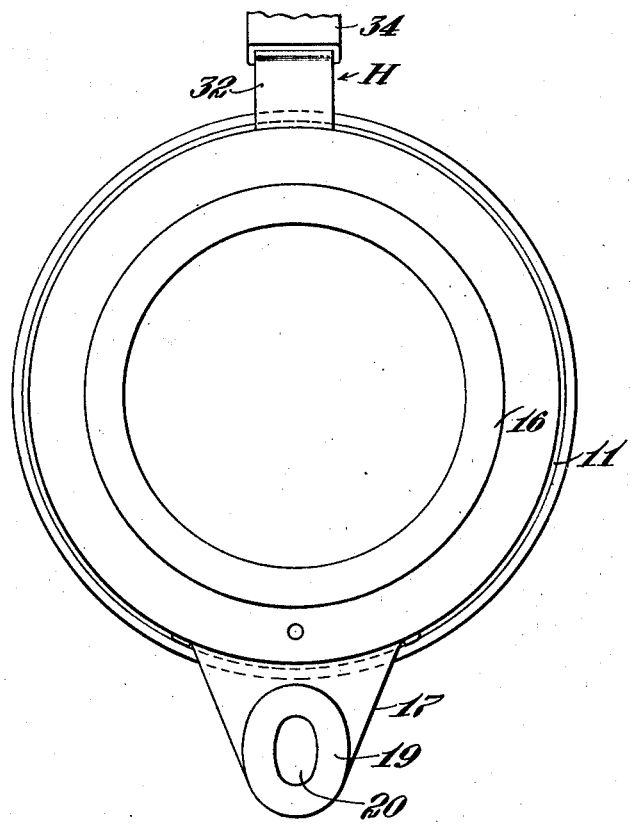
Fig. 3 is a plan view of the pot proper, with the water reservoir and coffee receptacle removed.
Figure 4:
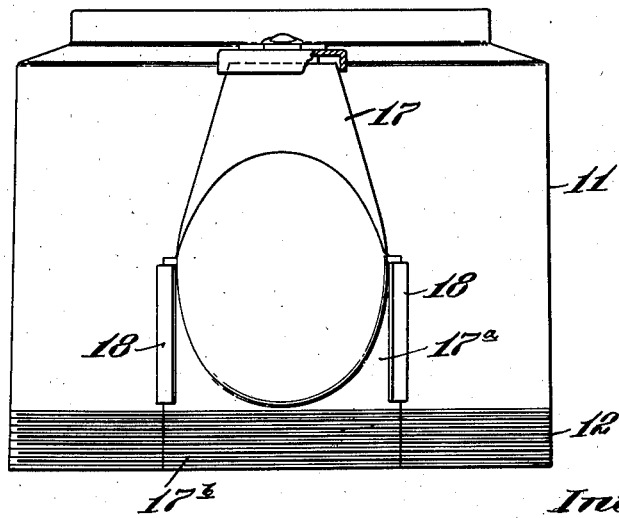
Fig. 4 is a front elevation of the pot proper.
Figure 5:
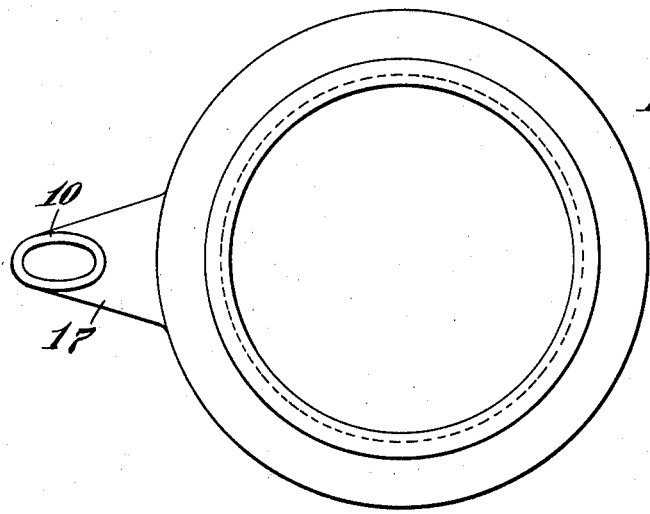
Fig. 5 is a plan view of the container for the hot beverage.
Figure 6:
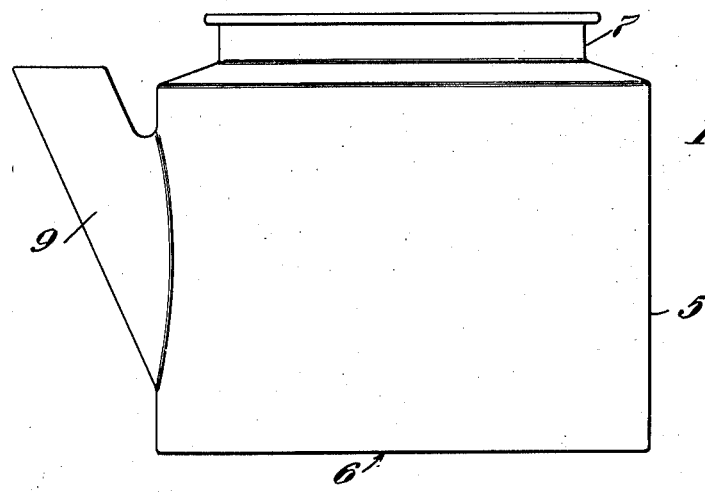
Fig. 6 is a side elevation of the container.

The coffee receptacle or basket 3 has a perforated bottom 35 and has an outwardly directed flange 36 at its top which, in use, rests upon the flange 16 of the shell 11. The hot water reservoir 4 comprises the lower part 37 which, in use, fits within the upper part of the coffee receptacle 3 and which has a substantially horizontal bottom 37ª (Fig. 3). This bottom is provided with a plurality of downwardly struck distributor flaps 38 defining narrow elongate slots 39 through which the hot water may slowly leak down onto the coffee within the receptacle 3. The downwardly struck tabs or flaps 38 are inclined in different directions and tend to cause the hot water to spread more widely over the coffee than though the bottom of the reservoir were provided merely with perforations, thus causing the coffee to be wet more uniformly than it would be without these distributing tabs or flaps.

The upper part of the reservoir 4 is provided with an inwardly directed sloping shoulder 40 and terminates in the cylindrical neck 41. The shoulder 40 is furnished with an air inlet opening 42, while the neck 41 receives the cover C comprising the top member 43 and the insulating plug 44, preferably a cork, held to the part 43 by a screw or the like and which fits snugly within the neck 41. A handle 45 is secured to the member 43 for convenience in handling the cover.

In the normal use of this device the parts are first arranged as in Fig. 1 with the ground coffee in the receptacle or basket 3 and with hot water in the reservoir 4, the cover C being placed in the top of the reservoir, as shown in Fig. 1. After the water has percolated down through the slits 39 into the coffee and thence through the latter into the container 5, the reservoir 4 and the coffee receptacle 3 are removed and the cover C is fitted down through the opening defined by the inner edge of the flange 16 into the neck 7 of the container, it being noted that this opening is of the same size as the opening defined by the neck 41 of the hot water reservoir 4. With the parts thus arranged as shown in Fig. 2, the beverage within the container 5 is maintained hot for a long time by reason of the thorough insulation of the container 5, not only by the insulating material interposed between the container and the outer shell, but also by reason of the insulating cover C and the lid 21 at the top of the spout.

When it is desired to pour the coffee, the lid 21 is raised and, if desired, swung laterally away from the top of the spout, and the coffee may then be poured as from a pot of usual type, the shape of the handle H being such as to facilitate a firm grip during the pouring operation. Since the washer 19a is firmly clamped between the top of the spout member 9 and the flange 19, there is no danger of leakage of coffee between the outer and inner spout members.

While the container 5 is well protected by the outer shell and the interposed cushioning material so that it is not easily broken, nevertheless, if through extreme temperature differences or unusual shocks it should be cracked or broken, it may readily be removed by unscrewing the cap 14, sliding off the lower spout member 17a, and then removing the container or its fragments from the outer shell. A new container may now be introduced, the part 17a slid back into place, and the cap 14 replaced,—the screwing of the cap into place compressing the washers 19a at 27 as well as the liner 28 of the cap and thus securely holding the container rigidly in place within the outer shell.

While the container 5 is here shown as of substantial thickness and has been described as of moulded glass, it may obviously be of other ceramic material, for instance porcelain, china, or the like, or of thin blown glass. Whatever the material, its heat-retaining ability may be enhanced by coating its outer surface with a reflecting film, for example by silvering it, as is commonly done in making the inner containers for vacuum bottles, or in fact the container 5 may be the inner shell of such a vacuum receptacle, the vacuum space then constituting insulating means.

While one desirable embodiment of the invention has been illustrated by way of example, it is to be understood that the invention is not necessarily limited to this precise embodiment but is to be regarded as broadly inclusive of any and all modifications and equivalent constructions which fall within the scope of the appended claims.

I claim:

1. A drip coffeepot having an inner container for the brewed coffee, an outer casing provided with a handle, and a cushioning jacket interposed between the casing and container, characterized in that the container is of vitreous material and of unitary construction and comprises a spout member, and the casing has a spout member within which the spout member of the container is normally nested, the casing having a removable bottom and a removable side wall section thereby to permit removal of the container with its spout from the casing.

2. A drip coffeepot having an inner container for the brewed coffee, an outer casing provided with a handle, and insulating means interposed between the casing and container, characterized in that the container is of unitary construction and comprises a spout member, the casing having a portion constituting a spout member within which the spout member of the container is normally nested, a portion of the spout-forming part of the casing being removable and the casing having a removable bottom thereby to permit removal of the container as a unit from the casing.

3. A drip coffeepot having an inner container for the brewed coffee, an outer casing provided with a handle, and insulating means interposed between the casing and container, characterized in that the container has a spout member and the casing has a spout member within which the spout member of the container is normally nested, means providing a leak-tight joint between the free ends of the spout members, and a removable bottom for the casing.

4. A drip coffeepot having an inner container for the brewed coffee, an outer casing provided with a handle, resilient cushioning means interposed between the upper part of the container and the upper part of the casing, the container and casing having spout members which are normally nested one within the other, respectively, cushioning means interposed between the open end of the spout member of the container and the end portion of the spout member of the casing, and a clamping member forming a part of the casing operative to force the container upwardly in the casing thereby to compress the aforesaid cushioning means and to provide leak-proof joints at the top of the container and at the free end of the composite spout.

5. A drip coffeepot having an inner container for the brewed coffee, an outer casing provided with a handle, a resilient washer interposed between the upper edge of the container and the upper edge portion of the casing, the container and casing having spout members which are normally nested one within the other, respectively, the casing comprising a removable bottom cap having screw-threaded engagement with the side wall of the casing, and being operative to apply upward clamping pressure to the container thereby to compress the washer at the upper edge of the container and form a leak-tight joint.

6. A drip coffeepot having an inner container for the brewed coffee, an outer casing provided with a handle, and insulating means interposed between the casing and container, characterized in that the container and casing have spout members normally nested one within the other, respectively, the spout member of the casing comprising a removable lower portion extending down substantially to the bottom of the casing, and the casing having a removable bottom cap normally holding the lower end of the removable part of the spout member in operative position.

7. A drip coffeepot having an inner container for the brewed coffee, an outer casing provided with a handle, and cushioning means interposed between the casing and container for protecting the container against accidental blows, characterized in that the container and casing have spout members normally nested one within the other, the spout member of the casing having a movable lower portion having sliding engagement with the casing proper, the casing also having a removable bottom cap so constructed and arranged as normally to prevent movement of the removable part of the spout member.

ANTONIO PAGLIUCO.